US012764620B2

(12) United States Patent
Sachs et al.

(10) Patent No.: US 12,764,620 B2
(45) Date of Patent: Oct. 13, 2026

(54) NETWORK NODE AND METHOD PERFORMED THEREIN

(71) Applicant: Telefonaktiebolaget LM Ericsson (publ), Stockholm (SE)

(72) Inventors: Joachim Sachs, Sollentuna (SE); Torsten Dudda, Wassenberg (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 213 days.

(21) Appl. No.: 18/580,251

(22) PCT Filed: Jul. 20, 2021

(86) PCT No.: PCT/SE2021/050742
§ 371 (c)(1),
(2) Date: Jan. 18, 2024

(87) PCT Pub. No.: WO2023/003498
PCT Pub. Date: Jan. 26, 2023

(65) Prior Publication Data
US 2024/0334272 A1 Oct. 3, 2024

(51) Int. Cl.
*H04W 36/00* (2009.01)

(52) U.S. Cl.
CPC ... *H04W 36/0085* (2018.08); *H04W 36/0016* (2013.01)

(58) Field of Classification Search
CPC ...................... H04W 36/0085; H04W 36/0016
See application file for complete search history.

(56) References Cited

U.S. PATENT DOCUMENTS

2004/0203831 A1 10/2004 Khan
2016/0302128 A1* 10/2016 Anchan ............... H04W 36/144
2021/0007036 A1 1/2021 Park et al.

FOREIGN PATENT DOCUMENTS

WO 2020197459 A1 10/2020
WO 2022002393 A1 1/2022

OTHER PUBLICATIONS

EPO Communication with Extended European Search Report dated Mar. 3, 2025 for Patent Application No. 21951063.3, consisting of 11 pages.
International Search Report and Written Opinion dated Mar. 23, 2022 for International Application No. PCT/SE2021/050742 filed Jul. 20, 2021, consisting of 11 pages.

(Continued)

*Primary Examiner* — Myron Wyche
(74) *Attorney, Agent, or Firm* — Weisberg I.P. Law, P.A.

(57) ABSTRACT

A method performed by a network node for handling configuration of a data connection for a UE in a communication network. The network node estimates a probability of a handover of the UE from a source node to a target node. The network node further estimates a handover latency (E) of the UE. At a time based on the estimated probability, the network node modifies the configuration of the data connection to accommodate for a handover interruption time delay based on the estimated handover latency (E).

14 Claims, 13 Drawing Sheets

(56) References Cited

OTHER PUBLICATIONS

3GPP TS 22.104 V17.5.0; 3rd Generation Partnership Project; Technical Specification Group Services and System Aspects; Service requirements for cyber-physical control applications in vertical domains; Stage 1 (Release 17); Mar. 2021, consisting of 76 pages.

Masri et al.; Machine-Learning-Based Predictive Handover; 2021 IEEE International Symposium on Integrated Network Management (IM); May 17, 2021, consisting of 5 pages.

Sana et al.; Multi-Agent Deep Reinforcement Learning for Distributed Handover Management in Dense MMWAVE Networks; 2020 IEEE International Conference on Acoustics, Speech and Signal Processing (ICASSP); May 5, 2020, consisting of 11 pages.

Lee et al.; Prediction-Based Conditional Handover for 5G MMWAVE Networks; IEEE Vehicular Technology Magazine; Jan. 14, 2020, consisting of 9 pages.

* cited by examiner

NETWORK NODE AND METHOD PERFORMED THEREIN

CROSS-REFERENCE TO RELATED APPLICATION

This application is a Submission Under 35 U.S.C. § 371 for U.S. National Stage Patent Application of International Application Number: PCT/SE2021/050742, filed Jul. 20, 2021 entitled "NETWORK NODE AND METHOD PERFORMED THEREIN FOR HANDLING CONFIGURATION OF A DATA CONNECTION FOR A USER EQUIPMENT," the entirety of which is incorporated herein by reference.

TECHNICAL FIELD

Embodiments herein relate to a network node and a method performed therein. Furthermore, a computer program and a computer readable storage medium are also provided herein. In particular, embodiments herein relate to handling configuration of a data connection of a user equipment (UE) within a communication network.

BACKGROUND

In a typical communication network, UEs, also known as wireless communication devices, mobile stations, stations (STA) and/or wireless devices, communicate via a Radio Access Network (RAN) to one or more core networks (CNs). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB", or a gNodeB. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes which can be connected directly to one or more core networks, i.e. they do not need to be connected to the core via RNCs.

With the emerging 5G technologies such as New Radio (NR), the use of a large number of transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify received signals coming from a selected direction or directions, while suppressing received unwanted signals coming from other directions.

Time-sensitive communication has the objective to meet a certain latency bound with a certain reliability. For different services different latency bounds may apply, as defined in 3GPP, Release 16, Technical Specification (TS) 22.104 and illustrated in FIG. 1.

Lower latencies may require that fewer retransmissions are permitted at the cost of lower spectral efficiency due to required lower link margins. This is illustrated in FIG. 2*a*. Higher reliability may require more aggressive configuration of transmissions within the latency bound to provide the right level of reliability.

In order to provide sufficiently high spectral efficiency, a transmission mode and link adaptation may be configured to achieve a required reliability level within a desired latency bound. Lower latencies or higher reliabilities are not desirable, as they would come at the cost of unnecessarily reduced spectral efficiency. This is illustrated in FIG. 2*b*.

Mobility events may lead to a failure of Ultra-Reliable Low-Latency Communication (URLLC). This is caused by mobility interruptions that are introduced during mobility. E.g. a handover procedure HO1 may lead to a certain mobility interruption of the communication, as depicted in FIG. 3. URLLC can be defined as a set of features that provide low latency and ultra-high reliability for mission critical applications such as industrial internet, smart grids, remote surgery and intelligent transportation systems, etc.

FIG. 4. shows an URLLC configuration that is configured for a specific service, where the retransmissions that are possible within the latency bound are considered to provide the desired reliability and latency.

FIG. 5 shows an example of when too high probability of latencies exceeds the latency bound. The mobility may lead to a further delay during the handover procedure. This may lead to a failure of the service due to the additional latency.

In order to avoid the service requirement failure due to too high probability of latencies exceeding the latency bound, as in FIG. 5, a conservative configuration may be considered. In a normal configuration, a device may be configured for a certain service requirement, e.g. a critical Quality-of-Service (QoS) flow with a latency bound of 15 ms at a reliability of 99.999%. For a mobile device, the worst-case latency scenario should be considered which includes interruption time during handover. Consequently, a conservative configuration as in FIG. 5 which also includes few retransmission opportunities and low spectral efficiency would be useful.

SUMMARY

An object of embodiments herein is to provide a mechanism for handling communication of a UE in a communication network in an efficient manner.

According to an aspect of embodiments herein the object may be achieved by a method performed by a network node for handling configuration of a data connection for a UE in a communication network. The network node estimates a probability of a handover of the UE from a source node to a target node. The network node further estimates a handover latency of the UE. At a time based on the estimated probability, the network node modifies the configuration of the data connection to accommodate for a handover interruption time delay based on the estimated handover latency.

According to another aspect of embodiments herein, the object is achieved by providing a network node for handling configuration of a data connection for a UE in a communication network. The network node is configured to estimate a probability of a handover of the UE from a source node to a target node. The network node is further configured to estimate a handover latency of the UE. At a time based on the estimated probability, the network node is configured to modify the configuration of the data connection to accommodate for a handover interruption time delay based on the estimated handover latency.

It is furthermore provided herein a computer program comprising instructions, which, when executed on at least one processor, cause the at least one processor to carry out the method above, as performed by the network node. It is additionally provided herein a computer-readable storage medium, having stored thereon a computer program comprising instructions which, when executed on at least one processor, cause the at least one processor to carry out the method above, as performed by the network node.

Embodiments herein are based on the realisation that the data connection may be configured for high spectral efficiency and only at the times of estimated handover occurrences lower spectral efficiency is used to provide latency margins for handover. Accordingly, by estimating a probability of a handover of a UE and estimating a handover latency, configuration of a data connection is modified to accommodate for a handover interruption time delay based on the estimated handover latency, only when handover of the UE occurs. Thereby the communication of the UE in the communication network is handled in an efficient manner.

BRIEF DESCRIPTION OF THE DRAWINGS

Embodiments will now be described in more detail in relation to the enclosed drawings, in which.

DETAILED DESCRIPTION

Figure 1:
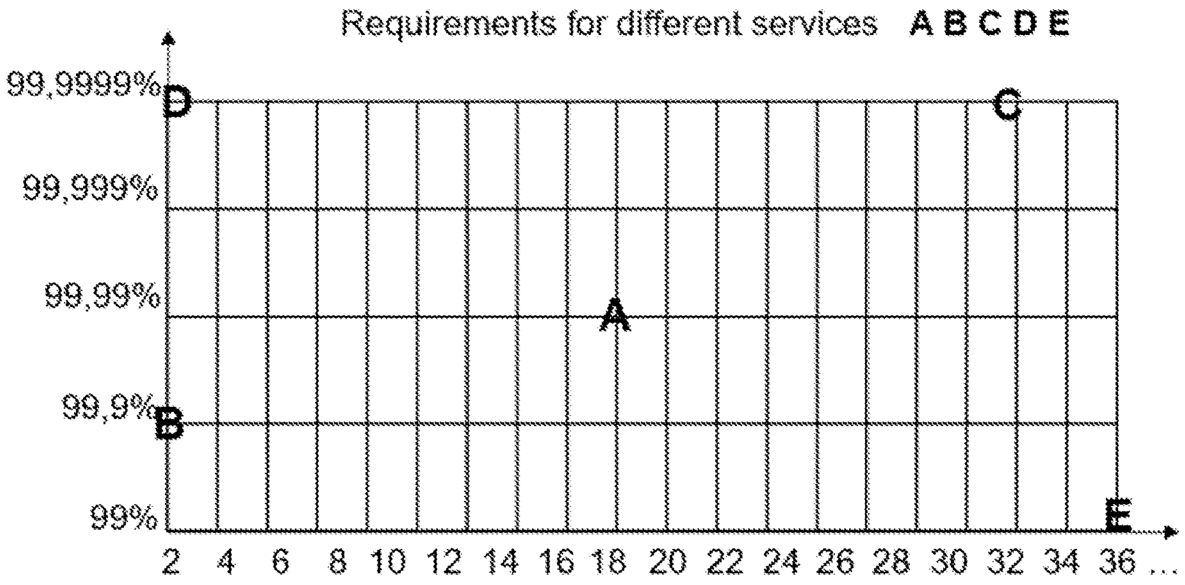
FIG. 1 is a schematic overview depicting latency bounds for different services.
Figure 2A:
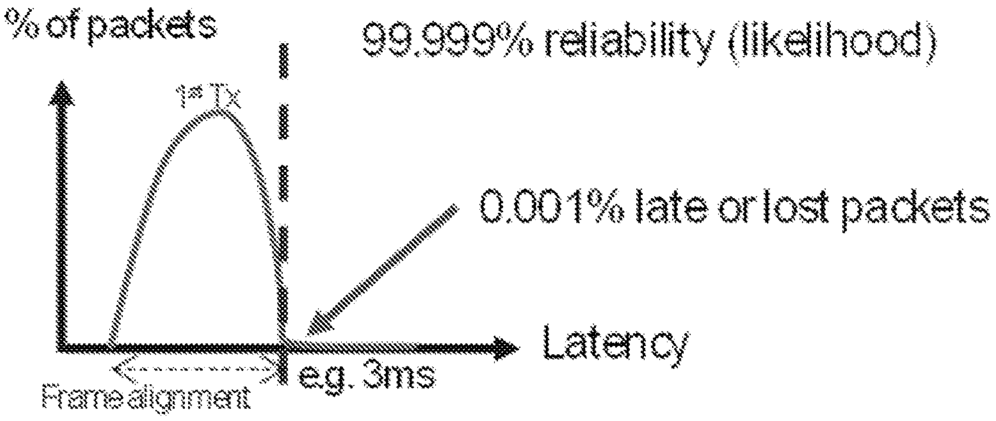
FIG. 2*a* is a schematic graph depicting an example of low spectral efficiency.
Figure 2B:
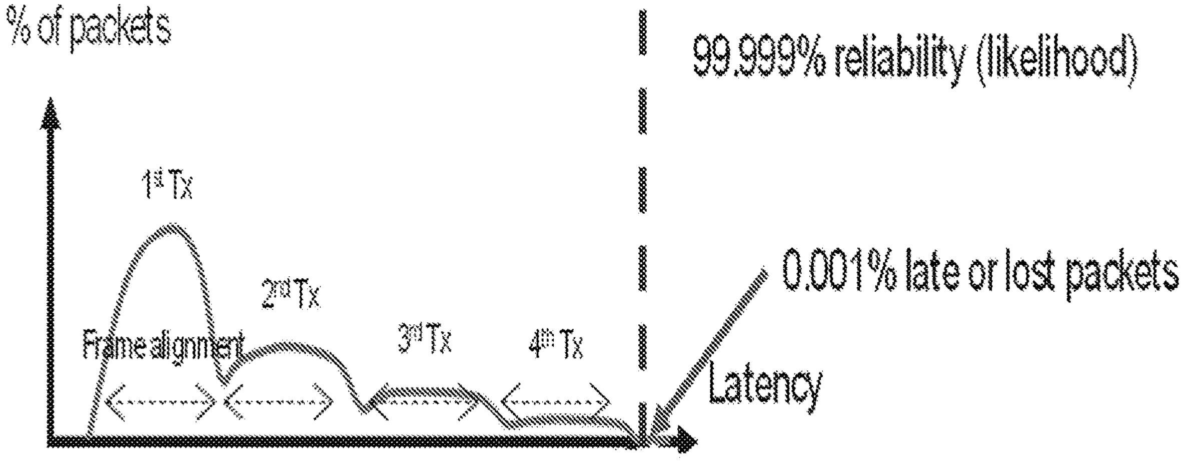
FIG. 2*b* is a schematic graph depicting an example of high spectral efficiency.
Figure 3:
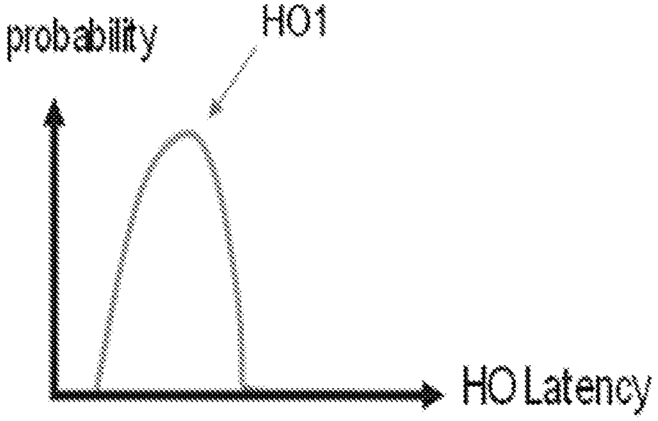
FIG. 3 is a schematic graph illustrating a handover procedure.
Figure 4:
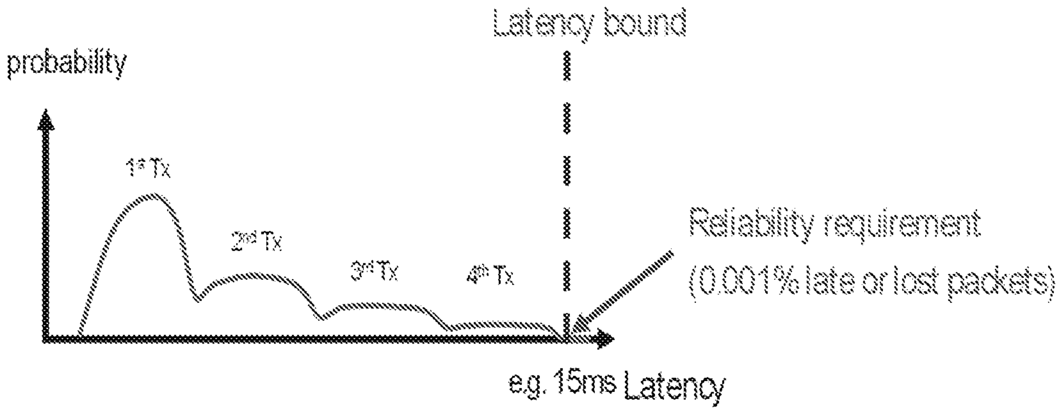
FIG. 4 is a schematic graph illustrating an URLLC configuration that is configured for a specific service.
Figure 5:
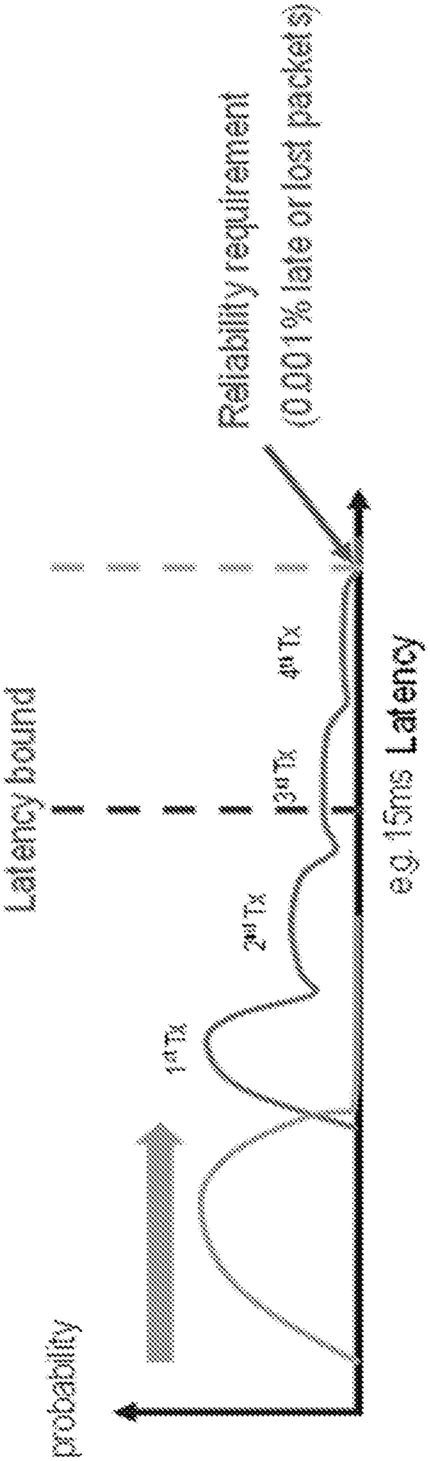
FIG. 5 is a schematic graph illustrating another handover procedure.
Figure 6:
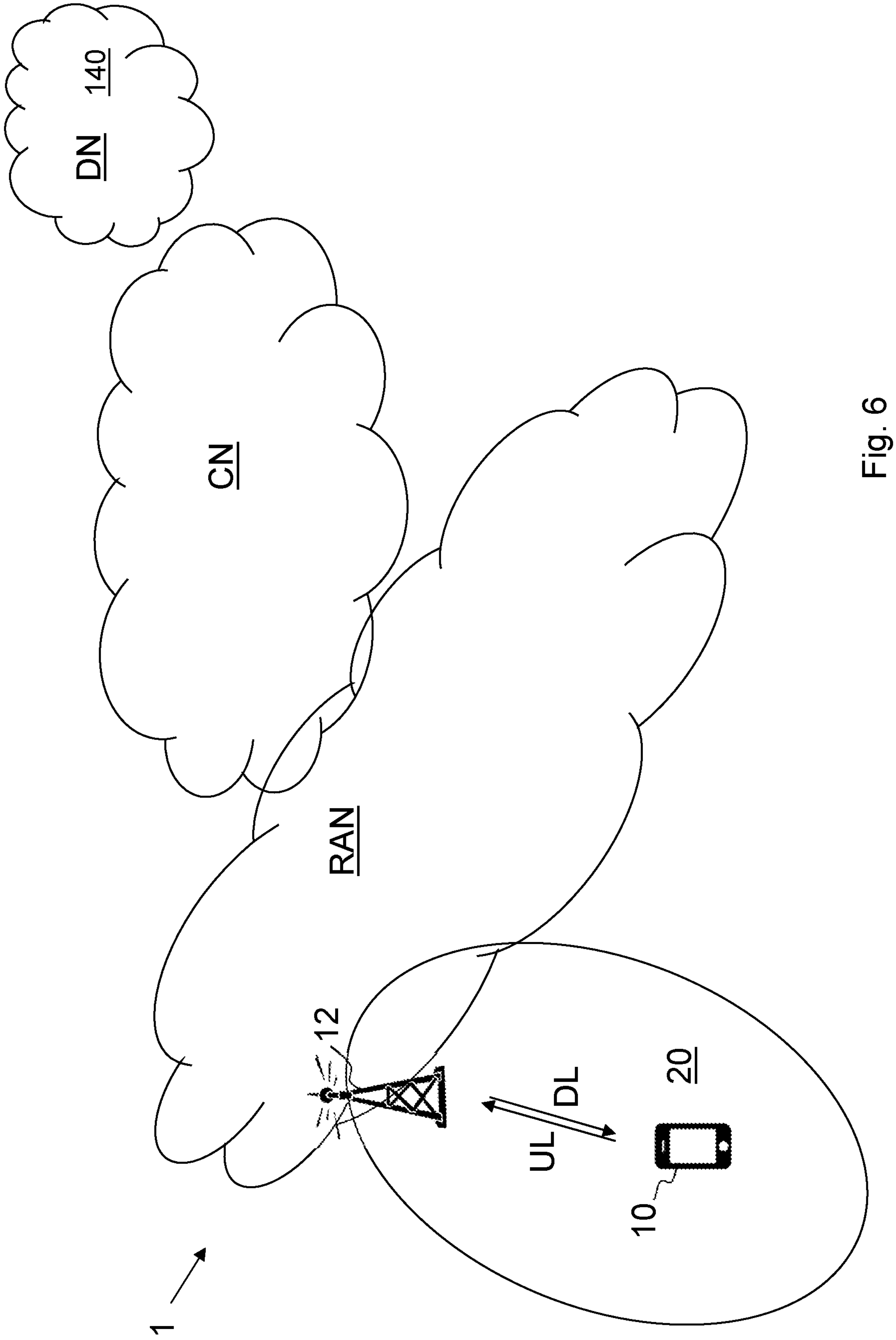
FIG. 6 is a schematic overview depicting a communication network according to embodiments herein.

Embodiments herein relate to communication networks in general. FIG. 6 is a schematic overview depicting a communication network 1. The communication network 1 comprises one or more RANs connected to one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. a WCDMA and or LTE system.

In the wireless communication network 1, wireless devices e.g. a UE 10 such as a mobile station, a non-access point (non-AP) station (STA), a STA, a user equipment and/or a wireless terminal, communicate via one or more Access Networks (AN), e.g. RAN, to one or more CNs. It should be understood by the skilled in the art that "UE" is a non-limiting term which means any terminal, wireless communication terminal, user equipment, Machine Type Communication (MTC) device, Device to Device (D2D) terminal, internet of things (IoT) operable device, or node e.g. smart phone, laptop, mobile phone, sensor, relay, mobile tablets or even a small base station capable of communicating using radio communication with a network node within an area served by the network node.

The communication network 1 comprises a network node 12, e.g. a radio network node, providing e.g. radio coverage over a geographical area, a first service area 20 i.e. a first cell, of a radio access technology (RAT), such as NR, LTE, Wi-Fi, WiMAX or similar. The network node 12 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The network node 12 may alternatively or additionally be a controller node or a packet processing node or similar. The network node 12 may be referred to as source node, source access node or a serving network node wherein the first service area 20 may be referred to as a serving cell, source cell or primary cell, and the network node communicates with the UE 10 in form of DL transmissions to the UE 10 and UL transmissions from the UE 10. The network node 12 may be a target node. The network node 12 may be a distributed node comprising a baseband unit and one or more remote radio units. It should be noted that a service area may be denoted as cell, beam, beam group or similar to define an area of radio coverage.

According to embodiments herein the network node 12 estimates a probability of a handover of the UE 10 from a source node to a target node and also estimates a handover latency of the UE 10. At a time based on the estimated probability, the network node 12 then modifies the configuration of the data connection to accommodate for a handover interruption time delay based on the estimated handover latency.

An advantage that may be achieved with the embodiments herein is that a data connection, e.g. a 5G data connection such as QoS flow, is not configured according to a worst-case scenario for the entire lifetime with low spectral efficiency. Instead, the data connection is configured for high spectral efficiency and only at the times of anticipated handover events lower spectral efficiency is used to provide latency margins for handover.

Figure 7:
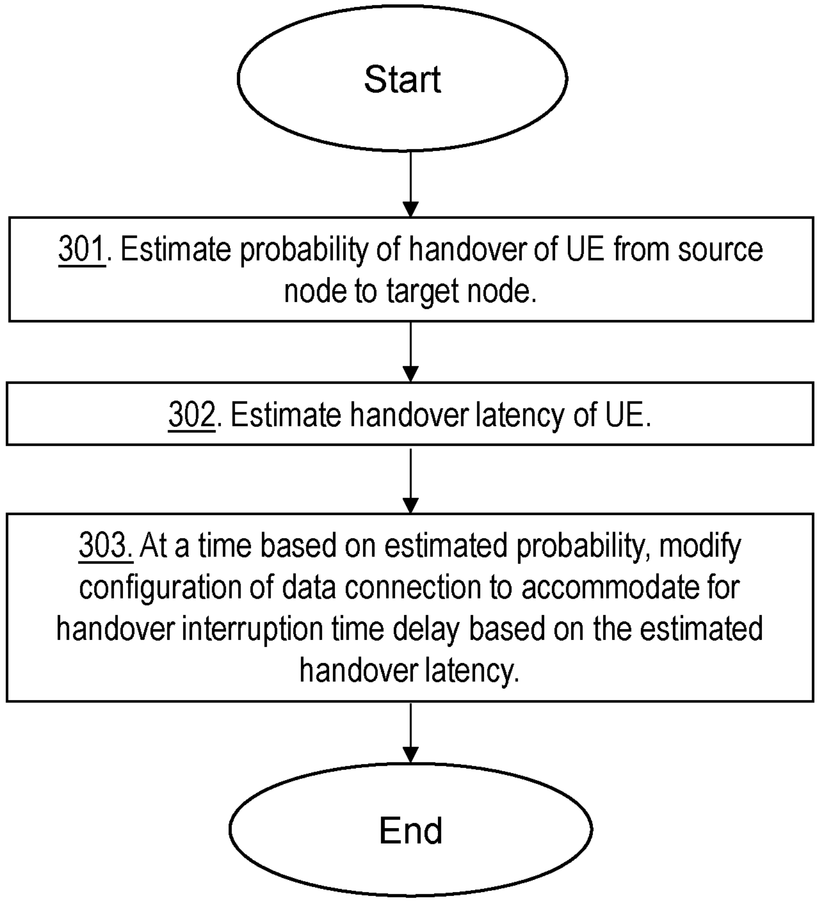
FIG. 7 is a flowchart depicting a method performed by a network node according to embodiments herein.

The method actions performed by the network node 12 for handling configuration of the data connection, e.g. a 5G data connection, for the UE 10 in the wireless communication network 1, according to embodiments herein, will now be described with reference to a flowchart depicted in FIG. 7. The actions do not have to be taken in the order stated below, but may be taken in any suitable order.

Action 700. To enable the network node 12 to adjust, e.g. accommodate, for handover interruption time delay only when the handover of the UE 10 occurs, the network node 12 can anticipate the probability of the handover. Therefore, the network node 12 first estimates the probability of the handover of the UE 10 from the source node to the target node. The estimating the probability of the handover may be based on handover related measurements and/or mobility predictions. Handover related measurements may e.g. be radio signal strength or quality measurements of a serving cell and/or neighbouring cells taken at the UE 10 and indicated to the network node 12. An example of mobility predictions may e.g. be based on observations of multiple radio signal strength or quality measurements of the serving cell and/or neighbouring cells, identifying a neighbouring cell becoming a candidate serving cell by the UE 10 when the neighbouring cell radio signal strength or quality measurement is becoming higher compared to the serving cell measurement.

A type of the handover may be identified to determine a corresponding handover interruption time. The type of handover may be identified in case of multiple options such as a conditional handover (CHO), dual active protocol stacks, multiple Transmission Reception Points (multi-TRP) and/or a conventional L3 handover.

The corresponding handover interruption time for each handover type is used for modifying the data connection differently for each handover type, to target lower latency bounds for the data transmissions accommodating the handover interruption time.

Action 701. To be able to accommodate for the handover interruption time the network node 12 also needs to know the handover latency. Therefore, the network node 12 then estimates the handover latency E of the UE 10. The estimating the handover latency may be based on a pre-configured knowledge. Pre-configured knowledge may e.g. be listed handover latencies for each handover type, from which the handover interruption time of the UE 10 can be estimated.

The estimated handover latency E may be indicated from the source node to the target node. This is advantageous because the source node may be able to better estimate the handover latency E than the target node, e.g. based on measurement availability and knowledge of data being transmitted or received. For uplink data transmissions, data transmissions may be interrupted by the handover interruption time based on handover latency, and thus it is of advantage for the target node to know the handover interruption time to modify the data connection to the UE 10, so that that this particular data can be transmitted faster i.e. with a targeted lower latency bound.

Action 702. The network node 12 now knows the estimated probability of the handover and the estimated handover latency E of the UE 10. Consequently, at the time based on the estimated probability, the network node 12 modifies the configuration of the data connection to accommodate for the handover interruption time delay based on the estimated handover latency E. The modifying the configuration of the data connection may be associated to one or more of: a lowering of a target latency T of link adaptation of the transmission of the data, a lowering of a block error rate (BLER) target and/or a packet data convergence protocol (PDCP) duplication. In some embodiments the target latency T of link adaptation of the transmission of the data may be based on O−E, wherein O is an original target latency and E is the estimated handover latency.

An advantage of embodiments herein is that the data connection, e.g. QoS flow, may not be configured according to the worst case for the entire life time with low spectral efficiency. Instead, the connection may be configured for high spectral efficiency and only at the times of anticipated handover events the lower spectral efficiency of is used to provide latency margins for handover.

Embodiments herein such as mentioned above will now be further described and exemplified. The text below is applicable to and may be combined with any suitable embodiment described above. According to an example scenario a URLLC connection may be configured for spectrally efficient operation wherein:

- the probability of handover is estimated, e.g. based on handover related measurements, mobility predictions or some other suitable method;
- the handover latency is estimated, e.g. based on pre-configured knowledge.

Figure 8:
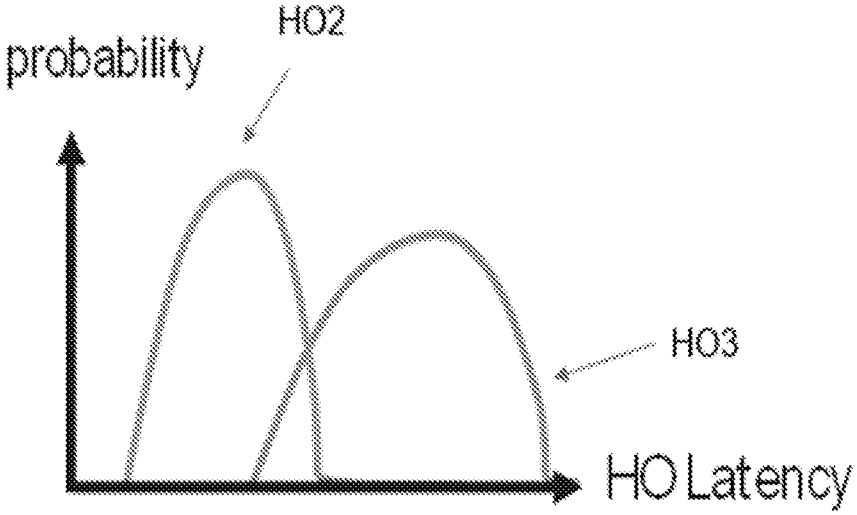
FIG. 8 is a schematic graph illustrating a handover procedure where a type of handover is identified in case of multiple options according to embodiments herein.

FIG. 8 depicts, according to some embodiments herein, the identification of the type of handover. The type of handover HO2 and HO3 may be identified in case of multiple options such as a CHO, dual active protocol stacks, multi-TRP and/or a conventional L3 handover, to determine the corresponding handover interruption time. For this the device capabilities as well as the network capabilities may be considered.

Figure 9:
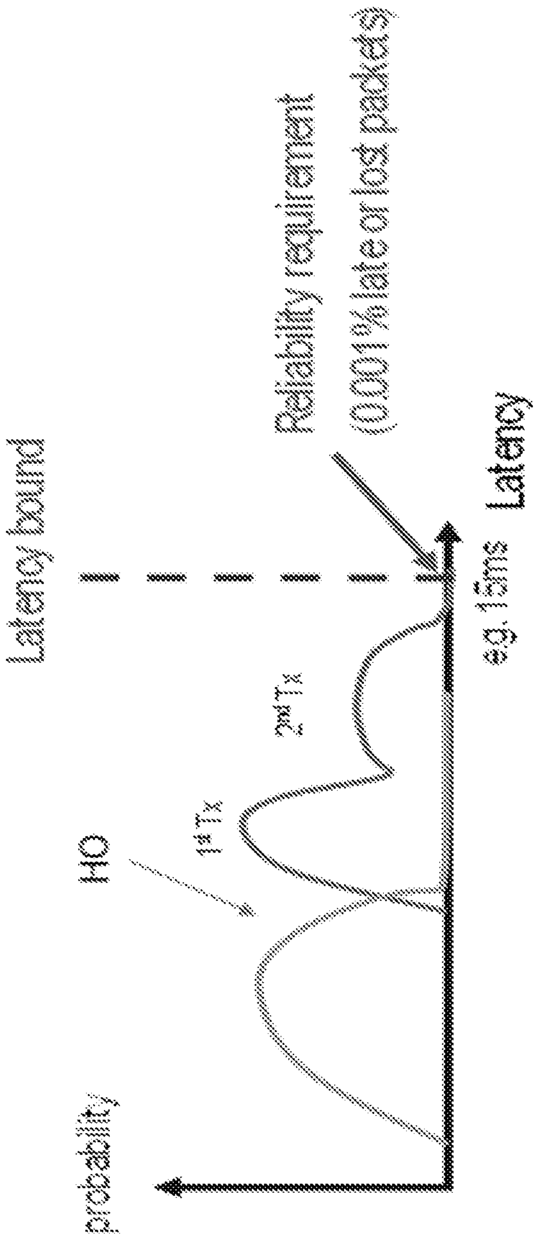
FIG. 9 is a schematic graph depicting a handover procedure where handover interruption delays are accommodated according to embodiments herein.

When the handover HO is imminent, e.g. at the time based on the estimated probability, the link configuration is modified to accommodate for handover interruption delays while still achieving the service requirement, as shown in FIG. 9. This may be performed by e.g. lower BLER target and/or PDCP duplication, etc., at the time period prior to the estimated, e.g. anticipated, handover. The considered target latency T used in scheduler/link adaptor, e.g. for transmission (Tx)/retransmission, may be changed, such that the target latency T=the original target latency O−the estimated handover latency E.

According to some embodiments, the handover target node link adaption/scheduling, e.g. the configuration of the data connection, is adjusted to accommodate for the handover latency. The target node may be informed with the estimated handover latency by the source node, e.g. the network node 12 or may be informed by a measured handover latency by the UE 10. For downlink traffic, e.g. for packets received by data forwarding from the source node, the target node may consider the buffering time and forwarding latency when scheduling the packets with a target latency bound, i.e. their target latency=original target latency−buffering time in the source node−forwarding time. For uplink traffic, i.e. for those uplink packets that have not yet been received by the source node, it may be guaranteed that their latency bound is met as well. Those packets may have needed to wait the handover interruption time in the UE 10 buffer before they could be transmitted to the target node. The target node in this case may need to expedite their transmission, i.e. considering a reduced latency bound for those packets (or all packets in UL following a handover). The target node may thus consider the target latency=original target latency−UL handover interruption time as the latency target in scheduling/link adaptation.

Figure 10:
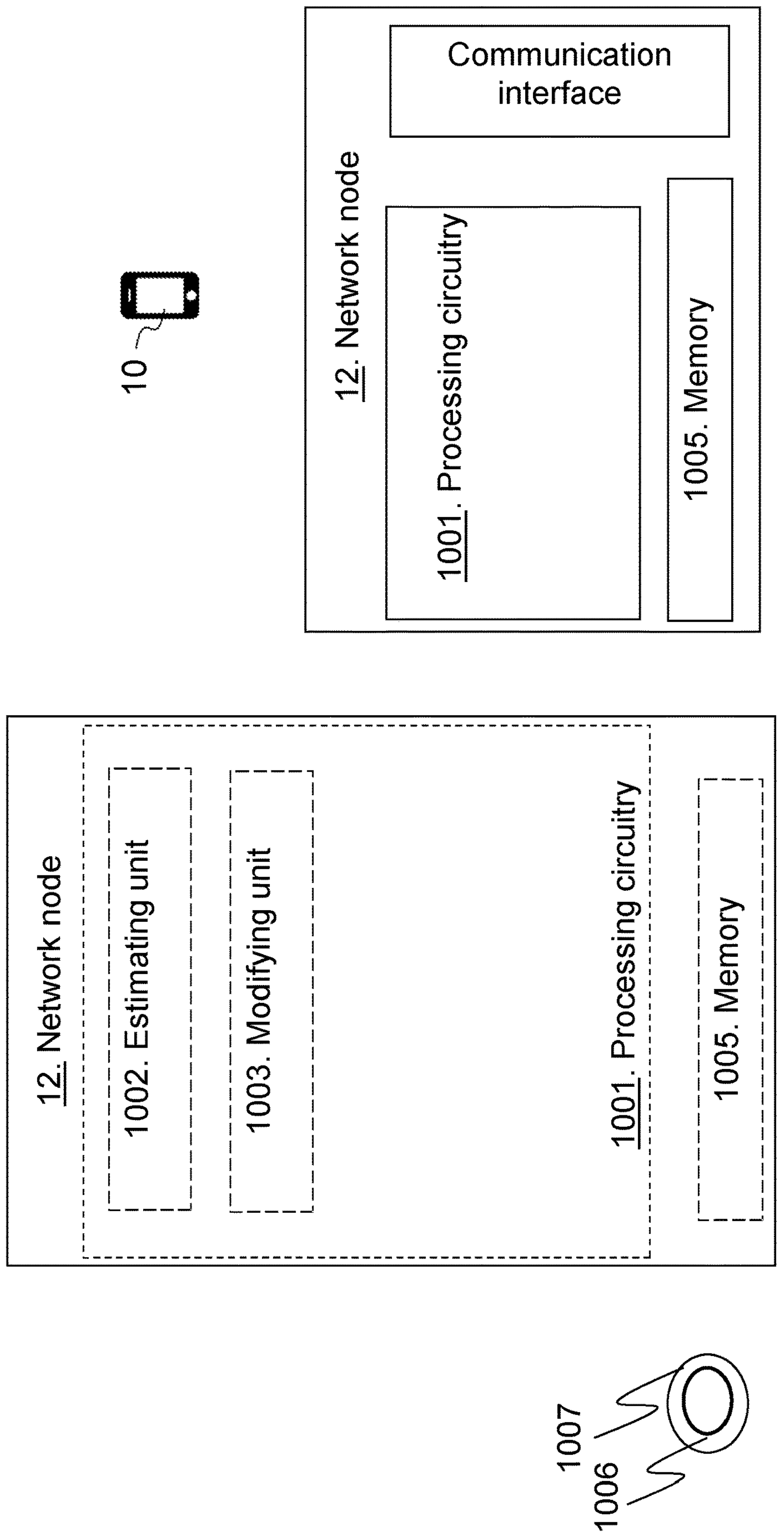
FIG. 10 is a block diagram depicting a network node according to embodiments herein.

FIG. 10 is a block diagram depicting the network node 12 for handling configuration of the data connection for the UE 10 in the wireless communication network 1, according to embodiments herein.

The network node 12 may comprise processing circuitry 1001, e.g. one or more processors, configured to perform the methods herein.

The network node 12 may comprise an estimating unit 1002. The network node 12, the processing circuitry 1001, and/or the estimating unit 1002 is configured to estimate the probability of the handover of the UE 10 from the source node to the target node. The estimating the probability of the handover may be based on handover related measurements and/or mobility predictions.

The network node 12, the processing circuitry 1001, and/or the estimating unit 1002 is configured to estimate the handover latency E of the UE 10. The estimating the handover latency E may be based on pre-configured knowledge. The estimated handover latency E may be indicated from the source node to the target node.

The network node 12 may comprise a modifying unit 1003. The network node 12, the processing circuitry 1001, and/or the modifying unit 1003 is configured to at the time based on the estimated probability, modify the configuration of the data connection to accommodate for the handover interruption time delay based on the estimated handover latency E. The modifying the configuration of the data connection may be associated to one or more of: the lowering of the target latency T of link adaptation of the transmission of the data, the lowering of the BLER target, and/or the PDCP duplication. The target latency T of link adaptation of the transmission of the data may be based on O− E, wherein O is the original target latency and E is the estimated handover latency. The type of the handover may be identified to determine the corresponding handover interruption time. The type of the handover may be identified based on capabilities of the UE 10 and/or the communication network.

The network node 12 further comprises a memory 1005. The memory 1005 comprises one or more units to be used to store data on, such as configuration information, handover latency information, handover information, handover interruption time delay, input/output data, metadata, etc. and applications to perform the method disclosed herein when being executed, and similar. The network node 12 may further comprise a communication interface comprising e.g. one or more antenna or antenna elements.

The method according to the embodiments described herein for the network node 12 is implemented by means of e.g. a computer program product 1006 or a computer program, comprising instructions, i.e., software code portions, which, when executed on at least one processor, cause the at least one processor to carry out the actions described herein, as performed by the network node 12. The computer program product 1006 may be stored on a computer-readable storage medium 1007, e.g. a disc, a universal serial bus (USB) stick or similar. The computer-readable storage medium 1007, having stored thereon the computer program product, may comprise the instructions which, when executed on at least one processor, cause the at least one processor to carry out the actions described herein, as performed by the network node 12. In some embodiments, the computer-readable storage medium may be a transitory or a non-transitory computer-readable storage medium.

In some embodiments the general term "network node" is used and it can correspond to any type of radio-network node or any network node, which communicates with a wireless device and/or with another network node. Examples of network nodes are gNodeB, eNodeB, NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any radio access technology (RAT) or multi-RAT systems, where the devices receives and/or transmit signals, e.g. data, such as New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing units discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Further Extensions and Variations

Figure 11:
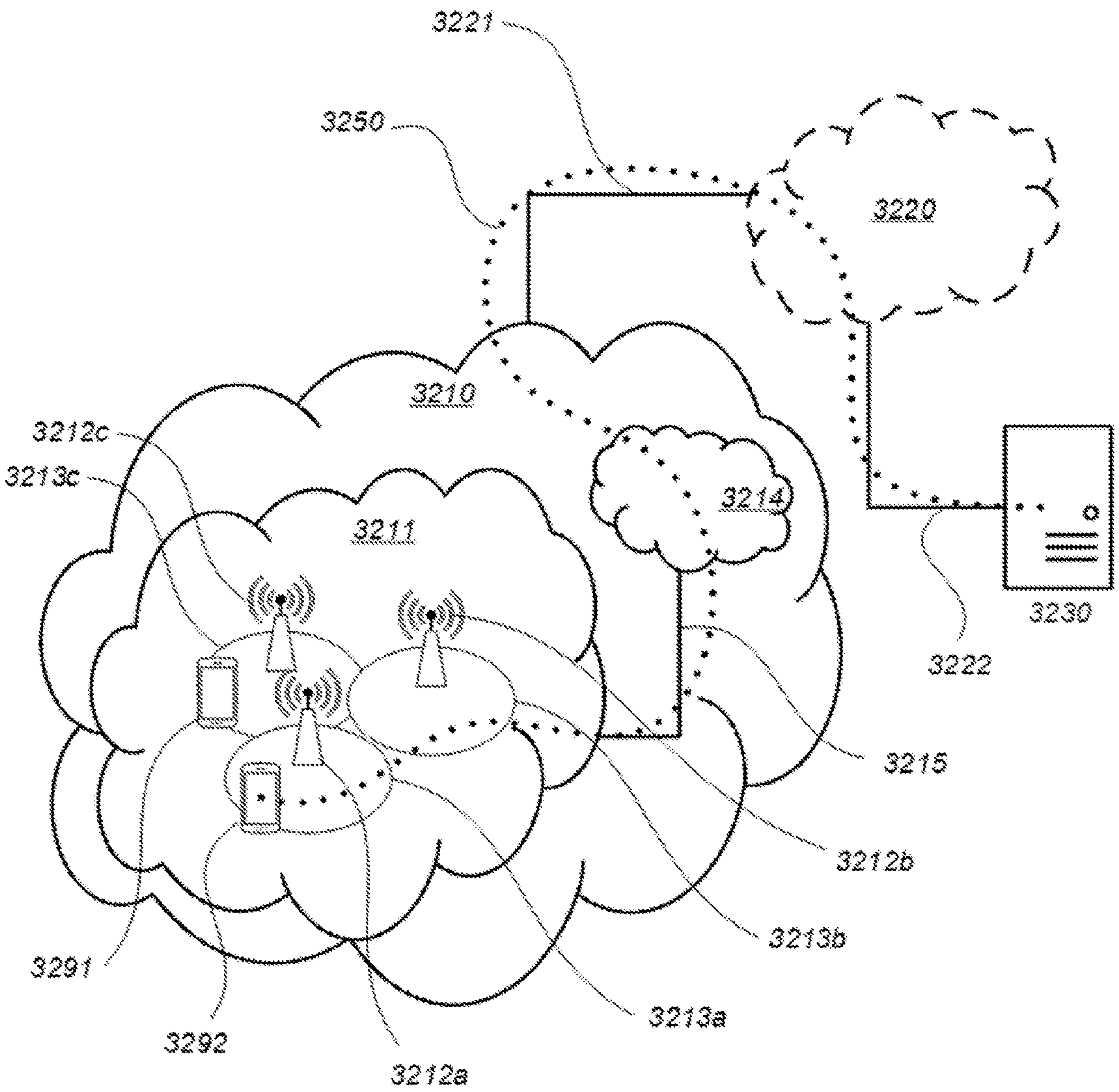
FIG. 11 schematically illustrates a telecommunication network connected via an intermediate network to a host computer.

With reference to FIG. 11, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212*a*, 3212*b*, 3212*c*, such as the radio network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the wireless devices 120 such as a Non-AP STA 3291 located in coverage area 3213*c* is configured to wirelessly connect to, or be paged by, the corresponding base station 3212*c*. A second UE 3292 e.g. the first or second radio node 110, 120 or such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 20 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions.

The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
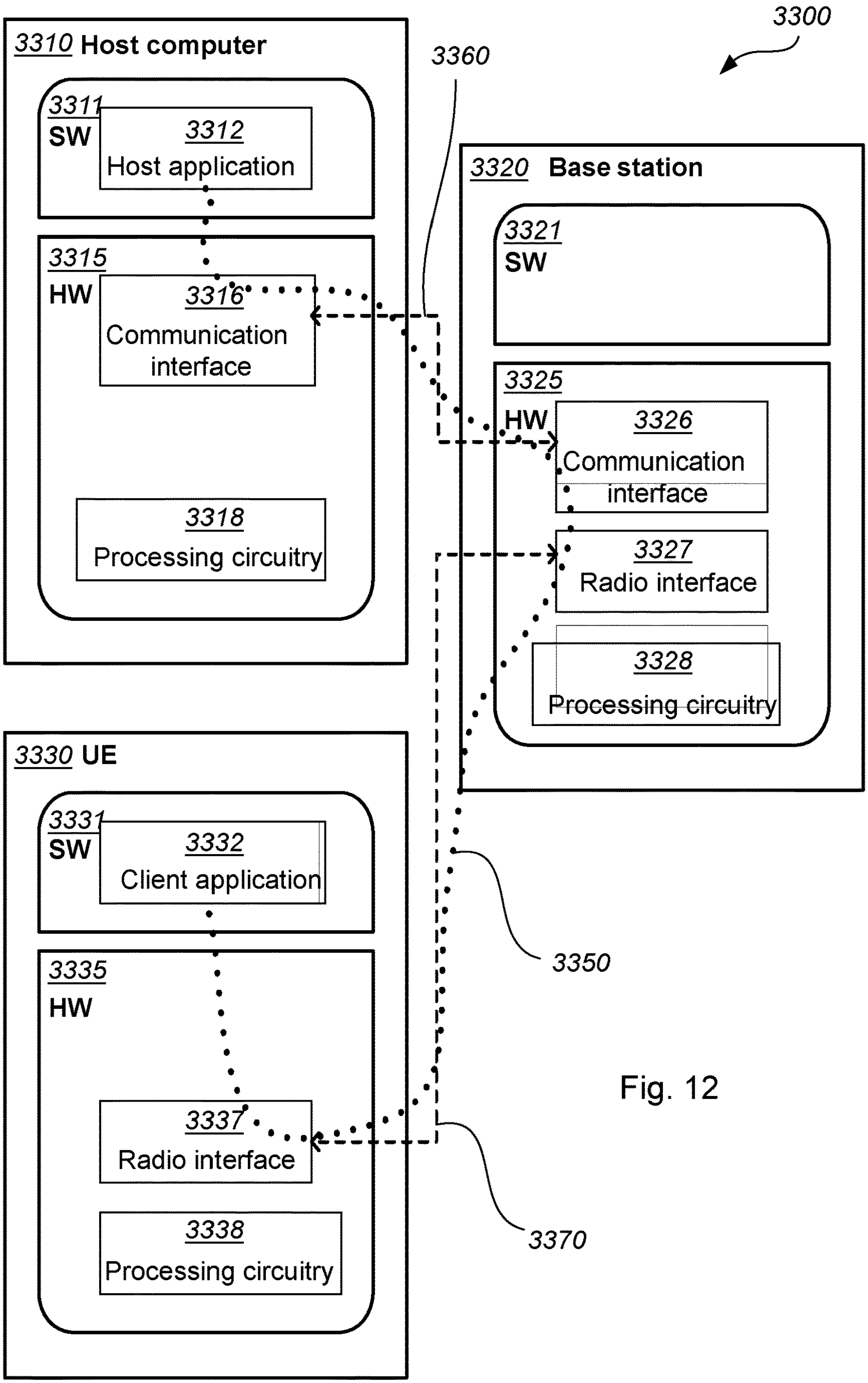
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212*a*, 3212*b*, 3212*c* and one of the UEs 3291, 3292 of FIG. 20, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may decrease the handover latency and thereby improve the communication in the communication network for the UE. This may also lead to extended battery lifetime of the UE.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 13:
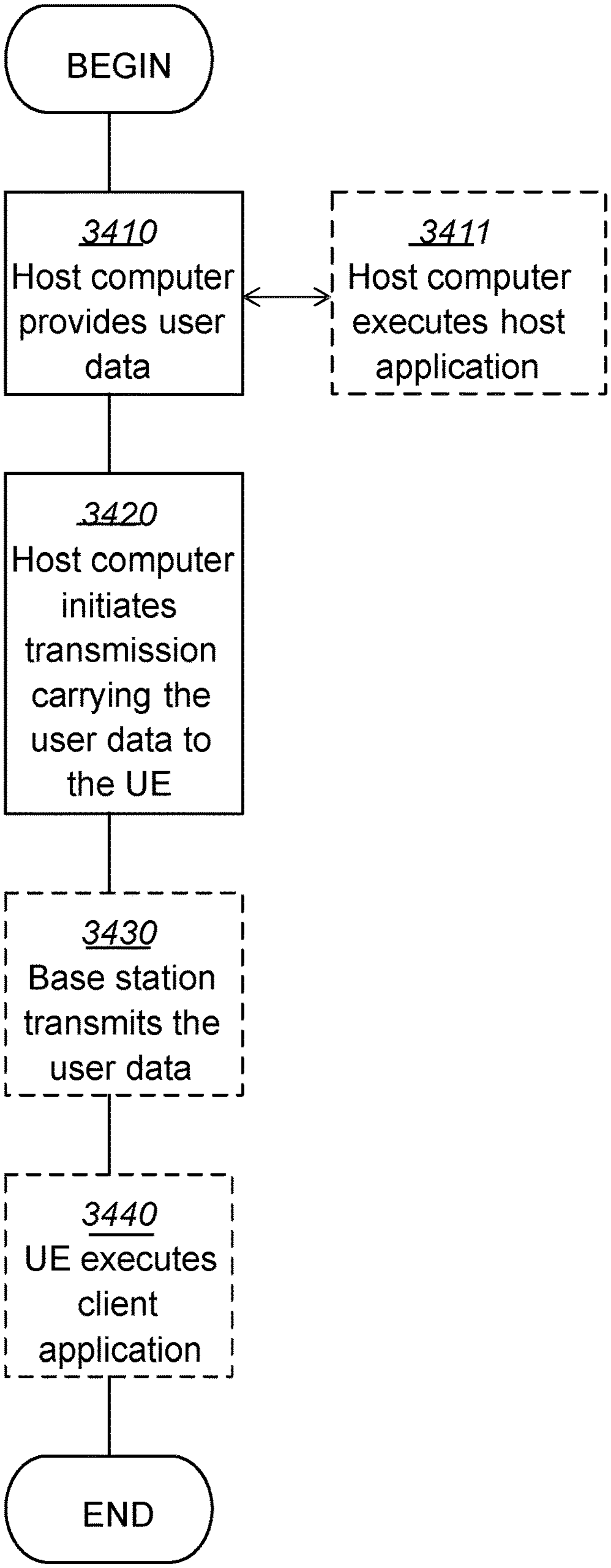
FIGS. 13 to 16 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

Figure 14:
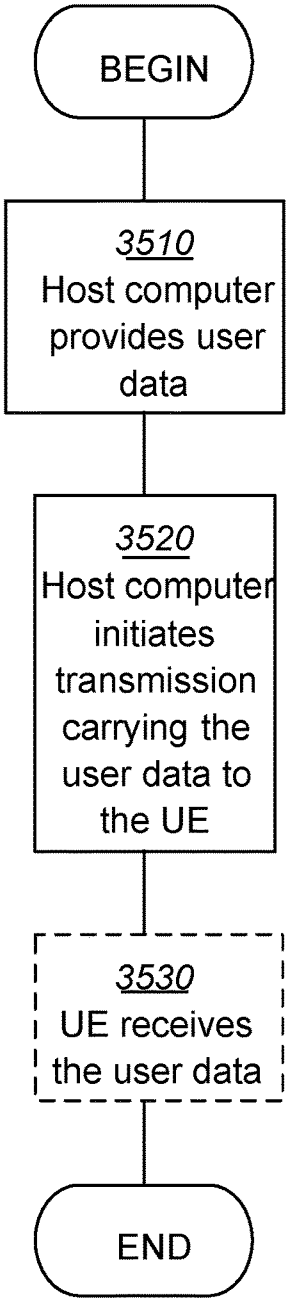

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 15:
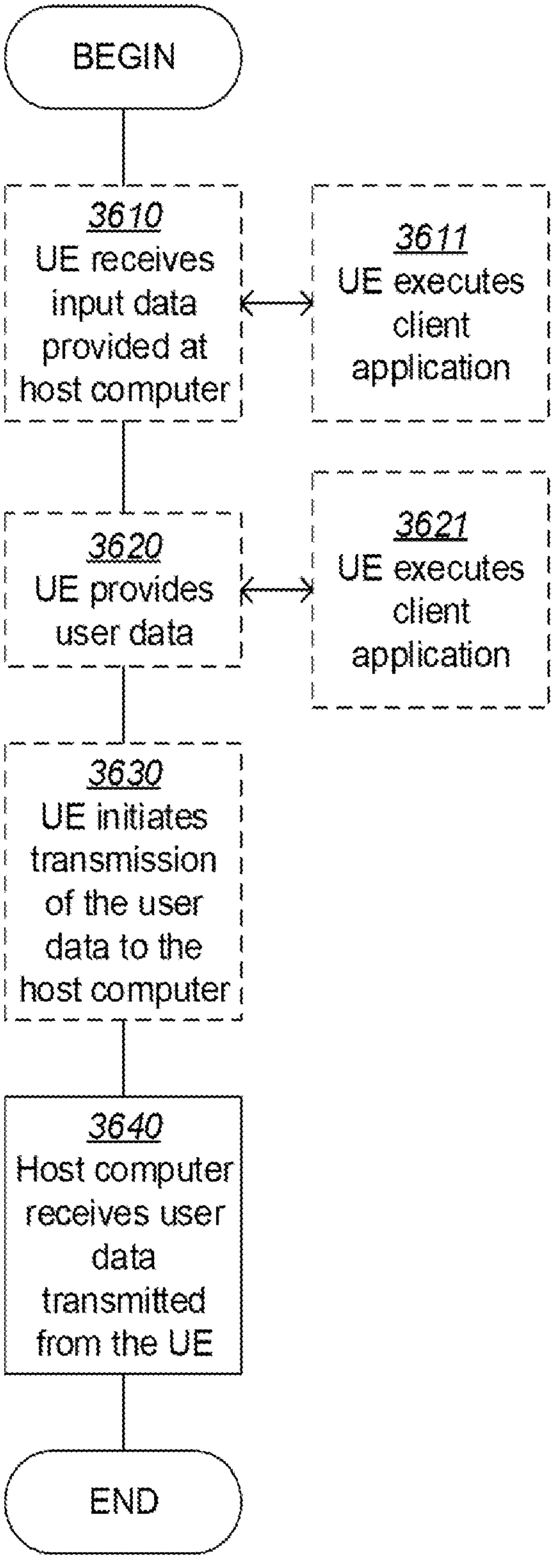

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 16:
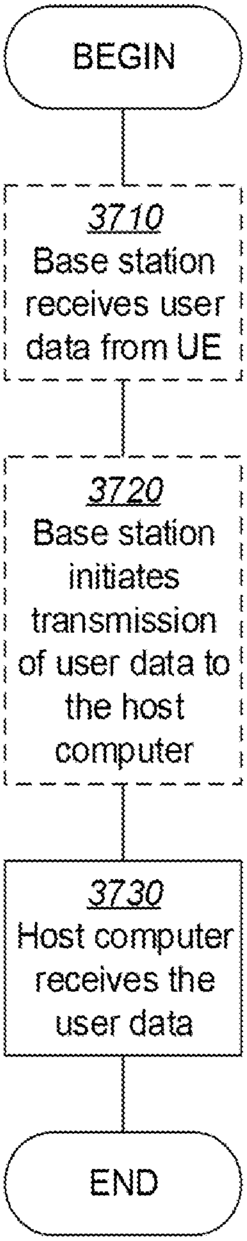

FIG. 16 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for handling configuration of a data connection for a user equipment (UE) in a communication network, the method comprising:

estimating a probability of a handover of the UE from a source node to a target node;

estimating a handover latency (E) of the UE; and at a time based on the estimated probability, modifying the configuration of the data connection to accommodate for a handover interruption time delay based on the estimated handover latency (E), modifying the configuration of the data connection associated to one or more of:

a lowering of a target latency (T) of link adaptation of the transmission of the data;

a lowering of a block error rate (BLER) target; and a packet data convergence protocol (PDCP) duplication.

2. The method according to claim 1, wherein the target latency (T) of link adaptation of the transmission of the data is based on (O)−(E), wherein (O) is an original target latency and (E) is the estimated handover latency.

3. The method according to claim 1, wherein the estimating the probability of the handover is based on one or both handover related measurements and mobility predictions.

4. The method according to claim 1, wherein the estimating the handover latency is based on pre-configured knowledge.

5. The method according to claim 1, wherein the estimated handover latency (E) is indicated from the source node to the target node.

6. The method according to claim 1, wherein a type of the handover is identified to determine the corresponding handover interruption time.

7. The method according to claim 6, wherein the type of the handover is identified based on capabilities of one or both of the UE and the communication network.

8. A network node for handling configuration of a data connection for a user equipment (UE) in a communication network, the network node being configured to:

estimate a probability of a handover of the UE from a source node to a target node;

estimate a handover latency (E) of the UE; and at a time based on the estimated probability, modify the configuration of the data connection to accommodate for a handover interruption time delay based on the estimated handover latency (E), modifying the configuration of the data connection associated to one or more of:

a lowering of a target latency (T) of link adaptation of the transmission of the data;

a lowering of a block error rate (BLER) target; and a packet data convergence protocol (PDCP) duplication.

9. The network node according to claim 8, wherein the target latency (T) of link adaptation of the transmission of the data is adapted to be based on (O)−(E), wherein (O) is an original target latency and (E) is the estimated handover latency.

10. The network node according to claim 8, wherein the estimating the probability of the handover is based on one or both of handover related measurements and mobility predictions.

11. The network node according to claim 8, wherein the estimating the handover latency is based on pre-configured knowledge.

12. The network node according to claim 8, wherein the estimated handover latency (E) is indicated from the source node to the target node.

13. The network node according to claim 8, wherein a type of the handover is identified to determine the corresponding handover interruption time.

14. The network node according to claim 13, wherein the type of the handover is identified based on capabilities of one or both of the UE and the communication network.

* * * * *